United States Patent [19]

Katz et al.

[11] 4,214,789
[45] Jul. 29, 1980

[54] TRAILER CONTAINER REAR HEADER

[75] Inventors: Sol Katz, Meadowbrook; Josef Bertsch, Mohnton; Howard J. Yurgevich, Levittown, all of Pa.

[73] Assignee: Strick Corporation, Ft. Washington, Pa.

[21] Appl. No.: 894,794

[22] Filed: Apr. 10, 1978

[51] Int. Cl.² ............................................. B62D 27/02
[52] U.S. Cl. ..................................... 296/183; 296/210
[58] Field of Search ................... 296/28 R, 28 M, 29, 296/30, 137 R, 91, 106, 35 R, 35 A, 183; 52/92, 262, 300; 220/71

[56] References Cited

U.S. PATENT DOCUMENTS

| | | | |
|---|---|---|---|
| 2,812,973 | 11/1957 | Pritchard | 296/28 M |
| 3,050,335 | 8/1962 | Schubach | 296/137 R |
| 3,353,863 | 11/1967 | Koot | 52/262 |
| 3,485,523 | 12/1969 | Carr | 296/28 M |
| 3,780,903 | 12/1973 | Clarkin | 220/71 |

FOREIGN PATENT DOCUMENTS 1215688  12/1970  United Kingdom ..................... 296/91

*Primary Examiner*—John J. Love
*Assistant Examiner*—John A. Carroll
*Attorney, Agent, or Firm*—Seidel, Gonda, Goldhammer & Panitch

[57] ABSTRACT

A trailer container or the like has a rear header that extends upwardly and rearwardly from the roof. The roof is supported by a horizontally disposed flange at or adjacent to the bottom surface of the rear header so that the vertical height from the container floor to the rear header bottom surface is substantially the same as the height from said floor to said roof.

9 Claims, 4 Drawing Figures

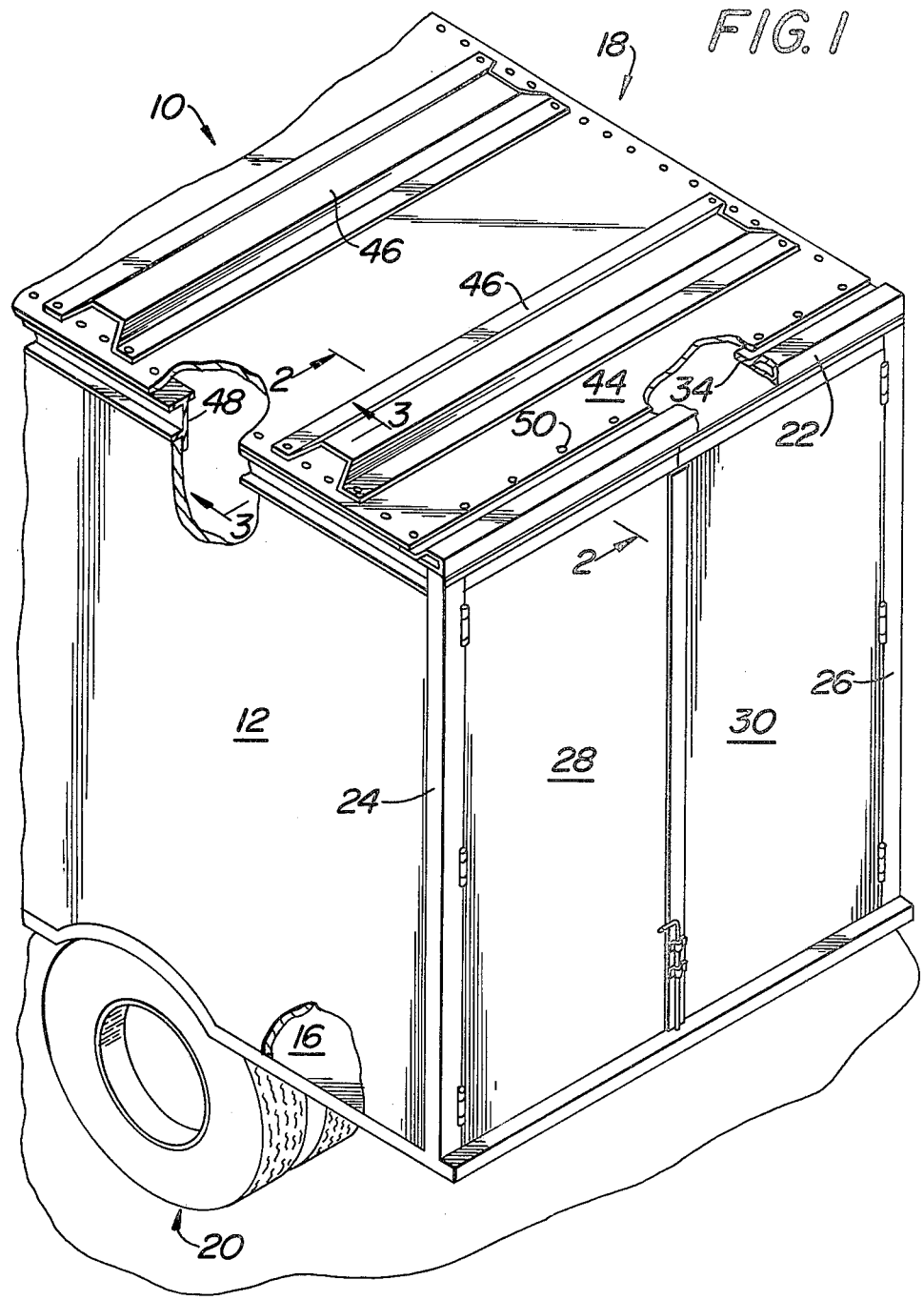

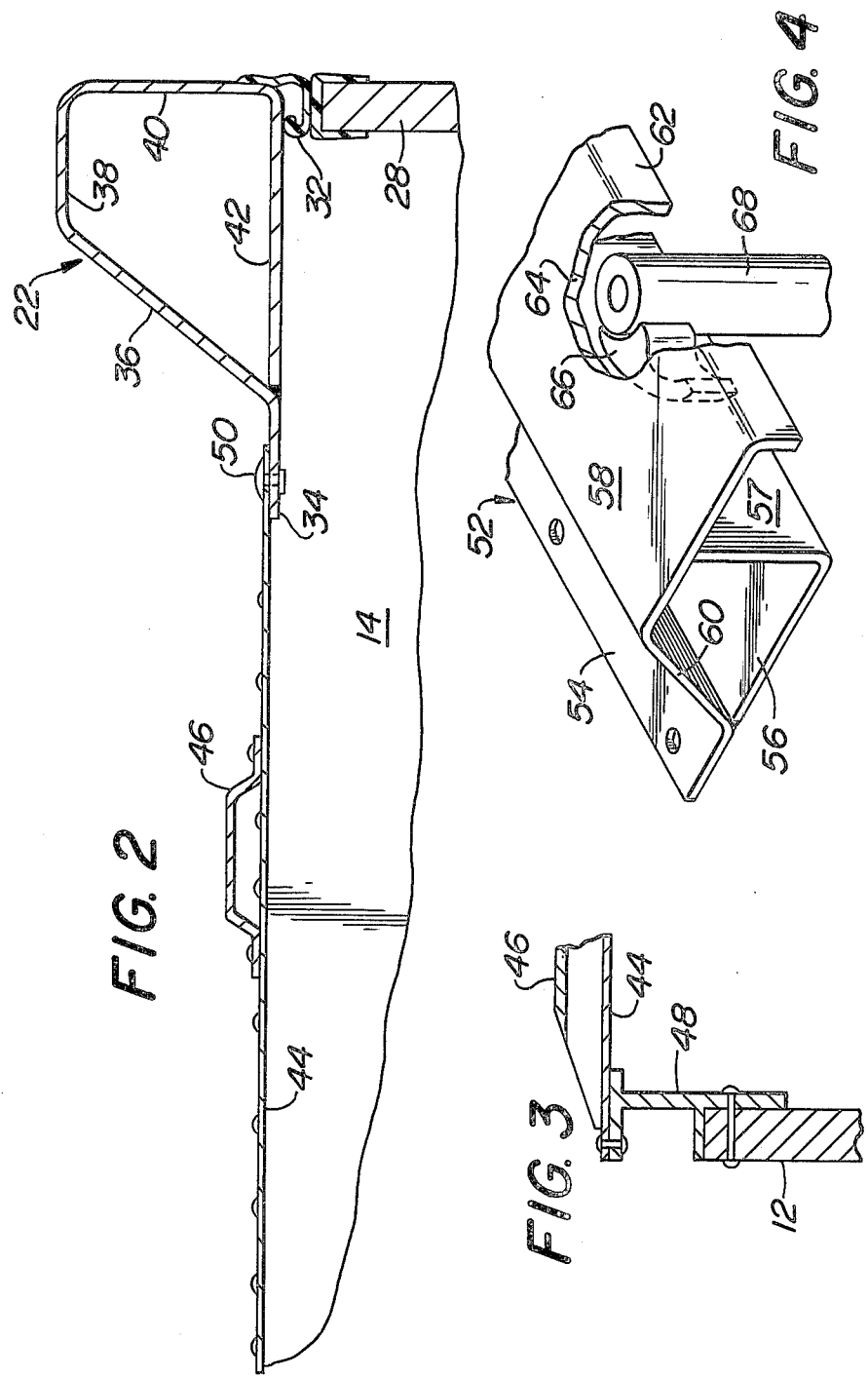

TRAILER CONTAINER REAR HEADER

BACKGROUND

Trailer containers, truck body structures, and the like conventionally have a rear header supported by corner posts at the rear end thereof. The roof is typically connected to a horizontal flange portion of the rear header located adjacent the upper end of the rear header. For example, see U.S. Pat. No. 3,485,523. Another example of a rear header on a vehicle body having a recessed roof below the elevation of the side walls is shown in U.S. Pat. No. 3,050,335.

In a typical trailer container, the rear header constitutes an obstruction since the distance from the floor to the bottom surface on the rear header is substantially less (3 to 8 inches) than the distance from the floor to the roof. Thus, the rear header constitutes an obstruction to the loading of the container. The present invention increases the rear door opening height without changing the basic body dimensions.

SUMMARY OF THE INVENTION

In accordance with the present invention, a trailer container or the like has a roof supported along one edge by a rear header which in turn is supported by corner posts. In accordance with the present invention, the rear header has a horizontally disposed flange adjacent the bottom surface of the header. One edge of the roof is supported by and coupled to said flange. The remainder of the header extends upwardly and rearwardly from said flange so that the vertical height from the container floor to the rear header bottom surface is substantially the same as the height from the container floor to the roof. The corner posts support the rear header so that the upper ends of the corner posts are below the elevation of said flange.

It is an object of the present invention to provide a trailer container, vehicle body structure or the like wherein the rear header extends rearwardly and upwardly from a horizontally disposed flange supporting the roof to thereby increase the height of the rear door opening up to the height of the corner posts.

Other objects will appear hereinafter.

For the purpose of illustrating the invention, there is shown in the drawings a form which is presently preferred; it being understood, however, that the invention is not limited to the precise arrangements and instrumentalities shown.

FIG. 1 is a partial perspective view of the rear end of a trailer container.

FIG. 2 is a sectional view taken along the line 2—2 in FIG. 1.

FIG. 3 is a sectional view taken along the line 3—3 in FIG. 1.

FIG. 4 is a partial perspective view of a rear header in accordance with another embodiment of the present invention.

Referring to the drawings in detail, wherein like numerals indicate like elements, there is illustrated the rear end portion of a trailer container designated generally as 10. The container 10 includes side walls 12 and 14 mounted on a bottom wall 16. The side walls 12 and 14 support a roof designated generally as 18. The container 10 may be provided with conventional running gear 20.

The container 10 has a rear header designated generally as 22. The rear header 22 supports one edge of the roof 18 as will be made clear hereinafter. Container 10 includes corner posts 24 and 26 which support the rear header 22 from below. That is, the bottom surface of the rear header 22 overlies the upper ends of the corner posts 24, 26 and are connected thereto in any convenient manner. Doors 28 and 30 are hinged to the corner posts 26 and have a seal 32 at their upper edge for contact with a portion of the header 22.

As shown more clearly in FIG. 2, the rear header 22 has a horizontally disposed flange 34 at or adjacent to the bottom surface of the header 22. From the flange 34, the header 22 extends rearwardly upwardly and includes sloping or angled portion 36, horizontally disposed portion 38, vertically disposed portion 40, and horizontally disposed portion 42. Portions 36 and 42 are welded together so as to form a header which is tubular. Header 22 may be extruded in the shape illustrated in FIG. 2 or may be bent and shaped from a plate to the configuration shown. As will be apparent from FIG. 1, the ends of the header 22 overlie the upper ends of the corner posts 24, 26. The rear header 22 may be constructed of steel, aluminum, or any other suitable material.

The roof 18 includes a roof skin or panel 44 having transverse reinforcements 46 at spaced points therealong. The reinforcements 46 are parallel to the rear header 22. As shown more clearly in FIG. 3, the ends of the reinforcements 46 are beveled and the side edges of roof skin or panel 44 are each supported by and attached to a flange on a side rail 48. Each side wall 12, 14 is likewise secured to the associated side rail 48. One edge of the roof skin or panel 44 is coupled to the flange 34 in any suitable manner such as by fastener 50, adhesive, or the like. While the roof skin or panel 44 may be attached to either the lower or upper surface of the flange 34, the coupling therebetween is preferably as shown in FIG. 2.

In FIG. 4, there is illustrated a perspective view of a portion of a rear header in accordance with another embodiment of the present invention designated generally as 52. Rear header 52 is comprised of two components. The first component is a L-shaped channel 56 having a vertically disposed leg 57 along one side edge with the opposite side edge portion being designated at 54 and constituting a horizontally disposed flange for supporting the roof of the container. The other component of the rear header 52 is the plate 58 having an angled portion 60 extending to the flange 54 and being welded thereto. Plate 58 is welded to the upper end of leg 57 and projects rearwardly beyond leg 57 so as to terminate in a downwardly extending lip 62.

Plate 58 and lip 62 are provided with a semi-circular hole 64. A latch 66 on a vertically disposed pipe 68 is provided in the space below plate 58 and between lip 62 and leg 57. Pipe 68 is part of the latch for the rear doors on the container. In the position of latch 66 as shown in FIG. 4, the doors are latched. When pipe 68 is rotated through an arc of about 90°, in a clockwise direction in FIG. 4, the rear doors will be permitted to open and pipe 68 will pivot outwardly through the hole 64 with the doors.

In each embodiment of the present invention, the rear header is supported by corner posts in a manner so that a roof supporting flange is at or adjacent to the bottom surface of the header so that the height of the rear door opening is in no way decreased by the header with respect to the vertical height from the floor to the roof of the container. Each side rail 48 is notched to accomodate flange 34 or 54 so that the top surfaces of the flanges are flush with the top surface of the side rails 48. Each rear header has a length corresponding to the width of the container. The angled portions 36 and 60 reduce wind resistance of the rear headers.

The increase in the height of the rear door opening is accomplished without changing the basic body dimensions as is frequently done on so-called wedge trailers. The present invention simplifies the design and manufacture of the container 10. A smooth interior roof structure is provided whereby there are no interior intrusions subject to damage from the commodity carried or stored in the vehicle and/or from the material handling devices used to load the vehicle. The manufacturing and assembly operation is simplified so as to allow the entire roof structure to be installed from the exterior of the container in one single stage.

The present invention may be embodied in other specific forms without departing from the spirit or essential attributes thereof and, accordingly, reference should be made to the appended claims, rather than to the foregoing specification, as indicating the scope of the invention.

We claim:

1. A container adapted to be used for transporting goods comprising side walls extending upwardly from a bottom wall, corner posts at one end of said side walls, at least one door closing said one end, a rear header supported by said corner posts, said rear header having a horizontally disposed bottom surface at an elevation corresponding to the surface at the upper end of said corner posts, said header having a horizontally disposed flange adjacent said bottom surface of the header, a roof, a rear edge of said roof being supported by said flange, said header having a portion extending upwardly and rearwardly from said one edge of said roof, said roof having reinforcements on the upper surface thereof, the side edges of said roof being secured to the top surface of discrete side rails, the top surface of each side rail being substantially coextensive with the top surface at the upper end of said corner posts, and the vertical height from the container floor to said rear header bottom surface being substantially the same as the height from said container floor to said roof.

2. In a trailer container in accordance with claim 1 wherein the bottom surface on said header overlies the upper end of said posts so that the length of the header corresponds to the width of said container.

3. In a trailer container in accordance with claim 1 wherein said header has a portion angled upwardly and rearwardly from said flange, said angled portion being connected to a horizontally disposed portion of said header.

4. In a trailer container in accordance with claim 1 wherein said header is tubular in cross-section, and said flange being coextensive with a horizontally disposed wall of said header.

5. A container adapted to be used for transporting goods comprising side walls extending upwardly from a bottom wall, a roof supported by the upper end of said side walls, at least one door closing one end of said container, a tubular top header at said one end of said container, said header having a horizontally disposed flange adjacent the bottom surface of the header, one edge of said roof being supported by said flange, said header having an angled portion extending upwardly from the roof and rearwardly from said one edge to minimize wind resistance, said roof having reinforcements on the upper surface thereof, and the vertical height from the container floor to said rear header bottom surface being substantially the same as the height from said container floor to said roof.

6. A container in accordance with claim 5 wherein said header has a horizontally disposed wall at about the same elevation as said flange.

7. A container in accordance with claim 6 wherein said header has a vertically disposed wall perpendicular to said horizontally disposed wall, another horizontally disposed wall of said header extending rearwardly beyond said vertical wall and terminating in a downwardly extending lip spaced from said vertical wall.

8. A container in accordance with claim 5 wherein side edges of said roof are secured to the top surface of discrete side rails, the top surface of said side rails being at about the same elevation as the upper surface of said flange and at an elevation above the upper edge of said side walls.

9. In a trailer container or the like wherein a roof is supported along said one edge by a rear header which in turn is supported by corner posts, the improvement comprising a rear header having a horizontally disposed flange adjacent the bottom surface thereof, one edge of the roof being supported by and coupled to said flange, said header extending upwardly and rearwardly from said flange so that the vertical height from the container floor to said rear header bottom surface is substantially the same as the height from said container floor to said roof, said horizontally disposed portion of the header having a downwardly extending lip spaced from a parallel portion of the header, a hole in said lip and horizontally disposed portion for receiving a door latch, said header having a portion angled upwardly and rearwardly from said flange, said angled portion being connected to a horizontally disposed portion of said header.

* * * * *